US012304676B2

(12) United States Patent
Park

(10) Patent No.: US 12,304,676 B2
(45) Date of Patent: May 20, 2025

(54) VACUUM PACKAGING DEVICE

(71) Applicant: Byung Mu Park, Ansan-si (KR)

(72) Inventor: Byung Mu Park, Ansan-si (KR)

( * ) Notice: Subject to any disclaimer, the term of this patent is extended or adjusted under 35 U.S.C. 154(b) by 154 days.

(21) Appl. No.: 17/787,583

(22) PCT Filed: Dec. 17, 2020

(86) PCT No.: PCT/KR2020/018565
§ 371 (c)(1),
(2) Date: Jun. 20, 2022

(87) PCT Pub. No.: WO2021/125836
PCT Pub. Date: Jun. 24, 2021

(65) Prior Publication Data
US 2022/0411118 A1 Dec. 29, 2022

(30) Foreign Application Priority Data

Dec. 20, 2019 (KR) .................. 10-2019-0171843
Dec. 4, 2020 (KR) .................. 10-2020-0168575

(51) Int. Cl.
*B65B 31/06* (2006.01)
*B65B 31/04* (2006.01)
(Continued)

(52) U.S. Cl.
CPC ............ *B65B 31/06* (2013.01); *B65B 31/048* (2013.01); *B65B 51/14* (2013.01); *B29C 65/18* (2013.01);
(Continued)

(58) Field of Classification Search
CPC .............. B29C 65/18; B29C 66/00145; B29C 66/1122; B29C 66/43121;
(Continued)

(56) References Cited

U.S. PATENT DOCUMENTS 1,768,730 A * 7/1930 Anderson .................. E06B 1/70
49/470
2,253,946 A * 8/1941 Waters .............. B29C 66/81821
493/189
(Continued)

FOREIGN PATENT DOCUMENTS

CH          516434 A  * 11/1971    ............. B65B 31/06
DE       10023308 A1 * 12/2001    ............. B65B 31/02
(Continued)

OTHER PUBLICATIONS

Satori Seals, Physical properties of Rubber Written by Dale T. McGrosky (Year: 2018).*
(Continued)

*Primary Examiner* — Robert F Long
*Assistant Examiner* — Eduardo R Ferrero
(74) *Attorney, Agent, or Firm* — Revolution IP, PLLC

(57) ABSTRACT

A vacuum packaging device includes a hexahedral housing having a space inside; a grip unit in which a pair of grip bars selectively come into surface contact with each other above a front side of the housing; a suction nozzle unit which moves forward and backward along a guide inside an inner space of the housing; a pair of heat-pressing members which are respectively provided in the pair of grip bars; and lifting and lowering means for lifting and lowering an upper grip bar of the pair of grip bars and an upper heat-pressing member of the pair of the heat-pressing members inside the inner space of the housing by a process step.

1 Claim, 5 Drawing Sheets

(51) Int. Cl.
*B65B 51/14* (2006.01)
*B29C 65/00* (2006.01)
*B29C 65/18* (2006.01)
*B29L 31/00* (2006.01)
*B65B 59/04* (2006.01)

(52) U.S. Cl.
CPC ..... *B29C 66/00145* (2013.01); *B29C 66/1122* (2013.01); *B29C 66/43121* (2013.01); *B29C 66/73921* (2013.01); *B29C 66/8225* (2013.01); *B29C 66/8324* (2013.01); *B29C 66/849* (2013.01); *B29L 2031/7128* (2013.01); *B65B 51/146* (2013.01); *B65B 59/04* (2013.01)

(58) Field of Classification Search
CPC .......... B29C 66/73921; B29C 66/8225; B29C 66/8324; B29C 66/849; B29L 2031/7128; B65B 31/048; B65B 31/06; B65B 51/14; B65B 51/146; B65B 59/04; F16J 15/062; E06B 1/70; E06B 3/26347
See application file for complete search history.

(56) References Cited

U.S. PATENT DOCUMENTS

| | | | | | |
|---|---|---|---|---|---|
| 2,537,249 | A * | 1/1951 | Walton | ............... | F16J 15/062 285/918 |
| 2,672,268 | A * | 3/1954 | Bower | ............... | B29C 65/7847 229/87.08 |
| 2,838,894 | A * | 6/1958 | Paikens | ............... | B65B 31/06 53/512 |
| 2,963,838 | A * | 12/1960 | Harrison | ............... | B29C 65/30 53/512 |
| 3,009,851 | A * | 11/1961 | Madsen | ............... | B29C 66/8227 156/251 |
| 3,015,600 | A * | 1/1962 | Cook | ............... | B29C 66/8221 156/515 |
| 3,220,161 | A * | 11/1965 | Lohse | ............... | B65B 51/146 53/371.9 |
| 3,334,004 | A * | 8/1967 | Faust | ............... | B29C 65/743 156/499 |
| 3,430,414 | A * | 3/1969 | Ludwig | ............... | B65B 31/06 53/512 |
| 3,521,404 | A * | 7/1970 | Hager | ............... | E06B 1/70 49/495.1 |
| 3,553,059 | A * | 1/1971 | Stohlquist | ............... | B29C 66/8161 53/553 |
| 3,630,665 | A * | 12/1971 | Andersen | ............... | B65B 55/18 53/469 |
| 3,650,088 | A * | 3/1972 | Wilson | ............... | B65B 51/146 53/374.6 |
| 3,706,177 | A * | 12/1972 | Willett | ............... | B65B 51/146 53/76 |
| 3,939,624 | A * | 2/1976 | Gidewall | ............... | B65B 25/067 53/512 |
| 4,136,502 | A * | 1/1979 | Shore | ............... | B65B 31/06 53/493 |
| 4,221,101 | A * | 9/1980 | Woods | ............... | B29C 66/73921 53/512 |
| 4,241,558 | A * | 12/1980 | Gidewall | ............... | B65B 31/06 53/512 |
| 4,662,978 | A * | 5/1987 | Oki | ............... | B29C 66/81435 493/190 |
| 4,708,350 | A * | 11/1987 | Mizumoto | ............... | B82Y 15/00 277/410 |
| 4,860,523 | A * | 8/1989 | Teteishi | ............... | B65B 31/06 53/512 |
| 5,070,675 | A * | 12/1991 | Chuan-Shiang | ............... | B65B 31/06 53/512 |
| 5,258,592 | A * | 11/1993 | Nishikawa | ............... | H01H 13/063 200/302.2 |
| 5,561,964 | A * | 10/1996 | McIntyre | ............... | B29C 66/81431 53/373.3 |
| 5,638,664 | A * | 6/1997 | Levsen | ............... | B29C 65/222 53/512 |
| 5,685,513 | A * | 11/1997 | Tsukushi | ............... | E04G 3/325 269/21 |
| 5,737,906 | A * | 4/1998 | Ishimaru | ............... | B65B 31/06 53/512 |
| 6,591,868 | B1 * | 7/2003 | Navarro | ............... | F16K 31/122 137/596.18 |
| 7,262,389 | B2 * | 8/2007 | Irwin | ............... | B29C 66/4312 53/370.7 |
| 9,327,854 | B2 * | 5/2016 | Huang | ............... | B65B 31/024 |
| 2002/0043050 | A1 * | 4/2002 | Costello | ............... | B65B 51/146 53/512 |
| 2004/0256373 | A1 * | 12/2004 | Irwin | ............... | B29C 66/8122 219/243 |
| 2005/0108990 | A1 * | 5/2005 | Kahn | ............... | B65B 31/06 53/374.9 |
| 2006/0230711 | A1 * | 10/2006 | Higer | ............... | B65B 31/048 53/512 |
| 2007/0125498 | A1 * | 6/2007 | Kataoka | ............... | B65B 51/146 156/583.1 |
| 2007/0194028 | A1 * | 8/2007 | Ahn | ............... | B65D 81/2015 220/607 |
| 2007/0209326 | A1 * | 9/2007 | Tretina | ............... | F04C 25/00 53/434 |
| 2008/0223005 | A1 * | 9/2008 | Kim | ............... | B65B 31/046 53/510 |
| 2013/0101442 | A1 * | 4/2013 | Ann | ............... | B65B 51/146 417/545 |
| 2016/0325866 | A1 * | 11/2016 | Riccardi | ............... | B65B 43/267 |

FOREIGN PATENT DOCUMENTS

| | | | | |
|---|---|---|---|---|
| DE | 10234042 A1 * | 2/2004 | ............ | B29C 65/18 |
| JP | 09-012012 A | 1/1997 | | |
| KR | 10-0337110 B1 | 5/2002 | | |
| KR | 20130050822 A * | 11/2011 | ............ | B65B 31/06 |
| KR | 10-2012-0017505 A | 2/2012 | | |
| KR | 20130009189 A * | 1/2013 | | |
| KR | 20130019614 A * | 1/2013 | | |
| KR | 20130015506 A * | 2/2013 | | |
| KR | 10-2013-0031519 A | 3/2013 | | |
| KR | 10-2013-0034815 A | 4/2013 | | |
| KR | 10-2018-0001193 A | 1/2018 | | |
| KR | 10-2018-0059196 A | 6/2018 | | |

OTHER PUBLICATIONS

International Search Report for PCT/KR2020/018565 mailed Mar. 29, 2021 from Korean Intellectual Property Office.

* cited by examiner

US 12,304,676 B2

VACUUM PACKAGING DEVICE

TECHNICAL FIELD

The present invention relates to a vacuum packaging device, and more particularly, relates to a vacuum packaging device in which when vacuum packaging of a packaging bag is performed by inserting an opening of the packaging bag between a pair of grip bars, the pair of grip bars grips the packaging bag with a uniform pressing force in a longitudinal direction of the grip bars to prevent the packaging bag from being creased.

BACKGROUND

In general, a packaging machine (packaging device) is a machine intended to improve the durability of products by packaging various products, and to facilitate transportation or storage. Such packaging machines also exist in various forms and, among them, the packaging machine relates to a vacuum packaging machine that packs the product in a vacuum-maintained state, and in case of foods whose contents are chemically denatured over a period of time among various products, there are some food that must avoid contact with air.

For example, in the case of foods such as Jokbal (Pig's Feet), peeled chestnuts, and smoked pig's feet, if they are stored or transported in a usual packaging way, it is difficult to sell them as high-quality products because they deteriorate during the transport.

Therefore, in the case of the above-mentioned products, a packaging machine that completely exhausts the air inside a packaging sheet and maintains a vacuum therein by heat-sealing the packaging sheet to complete the packaging is a mainstream.

As the prior art, in Korean Patent Registration No. 10-0337110 (May 6, 2002), a heat-sealing device in which a pair of pinchers that can freely pinch and release an opening of a bag, nozzle that can be relatively inserted and removed into and from the bag through the opening, and a heat sealing mechanism for sealing the opening of the bag with heat sealing are installed in an device frame, control means for controlling a driving unit of the pair of pinchers, the nozzle, and the heat sealing mechanism is installed, the control means allows the pair of pinchers to pinch the opening of the bag and the nozzle relatively inserted into the bag, the air in the bag is sucked and discharged with the nozzle or the gas is supplied into the bag in a first pinching state, and when the suction/discharge process or the gas supply process to the bag ends, the nozzle is removed from the bag and the opening of the bag is further pinched with the pair of pinchers so that the nozzle is relatively drawn out from the bag and the gas is prevented from escaping out of the bag due to the withdrawal, the opening of the bag is sealed with the heat sealing mechanism in the second pinching state, an electric motor connected to the pinchers by a cam mechanism is provided, and the cam mechanism is configured of a cam body that is rotated by the electric motor, a first drive mechanism that has a cam follower for moving the pinchers to be pushed and pulled as the cam body rotates, and moves the pinchers from an open position to an intermediate position corresponding to the first pinching state by rotating the cam mechanism due to the rotation of the electric motor, and a second drive mechanism that has a solenoid which is magnetized when electricity is applied and is driven to move the pinchers from the intermediate position to a closed position corresponding to the second pinching state by pulling a connecting member of the pinchers.

However, in the conventional vacuum packaging device, when vacuum packaging is performed, the grip of the packaging bag is not even, so the sealing unit of the packaging bag is sealed in a creased state, and thereby there was a problem in that the sealing is not appropriately performed due to the creases, the sealing unit of the packaging bag is cracked, or the contents of the packaging are deteriorated due to the air entered the packaging bag.

SUMMARY OF INVENTION

Technical Problem

An object of the present invention is to provide a vacuum packaging device in which when a packaging bag is vacuum-packed by press-fitting and coupling elastic bars having circular cross-sections to fixing spaces of grip bars, and putting an opening of the packaging bag between a pair of grip bars, a pair of grip bars grip the packaging bag with a uniform pressure along a longitudinal direction of the grip bars, such that the packaging bag is not creased.

Solution to Problem

A vacuum packaging device according to the present invention includes a hexahedral housing having a space inside; a grip unit in which a pair of grip bars selectively come into surface contact with each other above a front side of the housing and which grip ends of a packaging bag that has entered between the pair of grip bars; a suction nozzle unit which moves forward and backward along a guide inside an inner space of the housing, enters an opening of the packaging bag gripped by the grip unit, and sucks the atmosphere inside the packaging bag to be a vacuum state; a pair of heat-pressing members which are respectively provided in the pair of grip bars, come into surface contact with each other to heat-press the ends of the packaging bag for which the suction has been completed to heat-fuse and seal the packaging bag; and lifting and lowering means for lifting and lowering an upper grip bar of the pair of grip bars and an upper heat-pressing member of the pair of the heat-pressing members inside the inner space of the housing by a process step, in which fixing spaces, which are open in directions facing each other in a longitudinal direction, are respectively formed inside the pair of grip bars, elastic bars having circular cross-sections are press-fitted and coupled through openings of the fixing spaces, and the elastic bars coupled to the fixing spaces apply a uniform pressure to the packaging bag that has entered between the pair of grip bars in a lateral direction to be gripped.

In this case, it is preferable that the elastic bar according to the present invention has a circular cross-section, is coupled by force fitting inside the fixing spaces of the grip bars, and forms an oval shape in the fixing space of the grip bar.

In addition, it is preferable that the elastic bar according to the present invention has a length that is contracted in a front-rear direction and extended in a vertical direction when being coupled to the fixing space of the grip bar.

In addition, it is preferable that the elastic bar according to the present invention is formed to have a cross-sectional area larger than a cross-sectional area of the fixing space, and a part of the elastic bar partially protrudes to the outside of the fixing space.

In addition, the elastic bar according to the present invention may be formed of a fixing body which has a length corresponding to the fixing space of the grip bar and is accommodated by being coupled to the fixing space, and the fixing body is formed of a cylindrical cross-sectional shape in the vertical direction along the longitudinal direction, and a grip head have a semicircular cross-sectional shape protruding to the outside of the fixing space is formed.

In addition, the elastic bar according to the present invention may be formed of a fixing body which has a length corresponding to the fixing space of the grip bar and is accommodated by being coupled to the fixing space, the fixing body may be formed of a cylindrical cross-sectional shape in the vertical direction along the longitudinal direction, and a grip head having a semicircular cross-sectional shape protruding to the outside of the fixing space may be formed, and a portion of the grip head forming a boundary with the fixing body may be formed to extend in the front-rear direction with a length corresponding to a width of the grip bar to form a step supported on an upper end of the grip bar.

Advantageous Effects

According to the present invention, when a packaging bag is vacuum-packed by press-fitting and coupling elastic bars having circular cross-sections to fixing spaces of grip bars, and putting an opening of the packaging bag between a pair of grip bars, a pair of grip bars grip the packaging bag with a uniform pressure along a longitudinal direction of the grip bars, such that the packaging bag is not creased and a defect rate is significantly reduced.

BEST MODE FOR INVENTION

Figure 1:
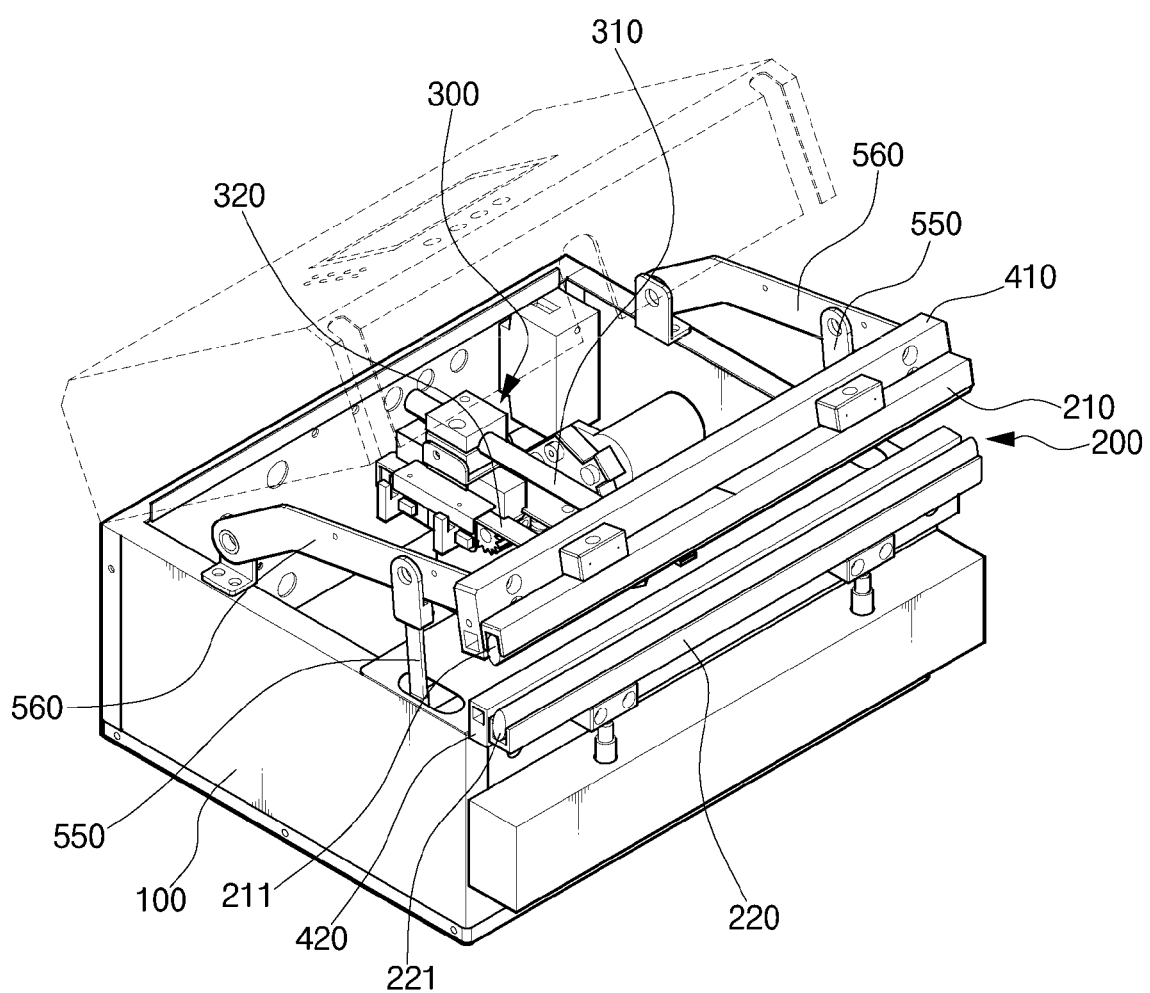
FIG. 1 is an exemplary view showing a vacuum packaging device according to an embodiment of the present invention.

The present invention provides a vacuum packaging device including a hexahedral housing having a space inside; a grip unit in which a pair of grip bars selectively come into surface contact with each other above a front side of the housing and which grip ends of a packaging bag that has entered between the pair of grip bars; a suction nozzle unit which moves forward and backward along a guide inside an inner space of the housing, enters an opening of the packaging bag gripped by the grip unit, and sucks the atmosphere inside the packaging bag to be a vacuum state; a pair of heat-pressing members which are respectively provided in the pair of grip bars, come into surface contact with each other to heat-press the ends of the packaging bag for which the suction has been completed to heat-fuse and seal the packaging bag; and lifting and lowering means for lifting and lowering an upper grip bar of the pair of grip bars and an upper heat-pressing member of the pair of the heat-pressing members inside the inner space of the housing by a process step, in which fixing spaces, which are open in directions facing each other in a longitudinal direction, are respectively formed inside the pair of grip bars, elastic bars having circular cross-sections are press-fitted and coupled through openings of the fixing spaces, and the elastic bars coupled to the fixing spaces apply a uniform pressure to the packaging bag that has entered between the pair of grip bars in a lateral direction to be gripped.

Hereinafter, preferred embodiments according to the present invention will be described in detail with reference to the accompanying drawings. Prior to this, the terms or words used in the present specification and claims should not be construed as being limited to their ordinary or dictionary meanings, and the inventor should properly understand the concept of the term in order to best describe his invention. Based on the principle that can be defined, it should be interpreted as meaning and concept consistent with the technical idea of the present invention.

Accordingly, the embodiments described in this specification and the configurations shown in the drawings are only the most preferred embodiments of the present invention, and do not represent all of the technical spirit of the present invention, so at the time of the present application, it should be understood that there may be equivalent variations that may be substituted.

According to the present invention relates to a vacuum packaging device in which when vacuum packaging of the packaging bag is carried out by entering an opening of a packaging bag between a pair of grip bars, the pair of grip bars grip the packaging bag with a uniform pressing force along a length direction of the grip bars, and the packaging bag is prevented from being creased, and the description thereof will be given below with reference to the drawings.

Figure 2:
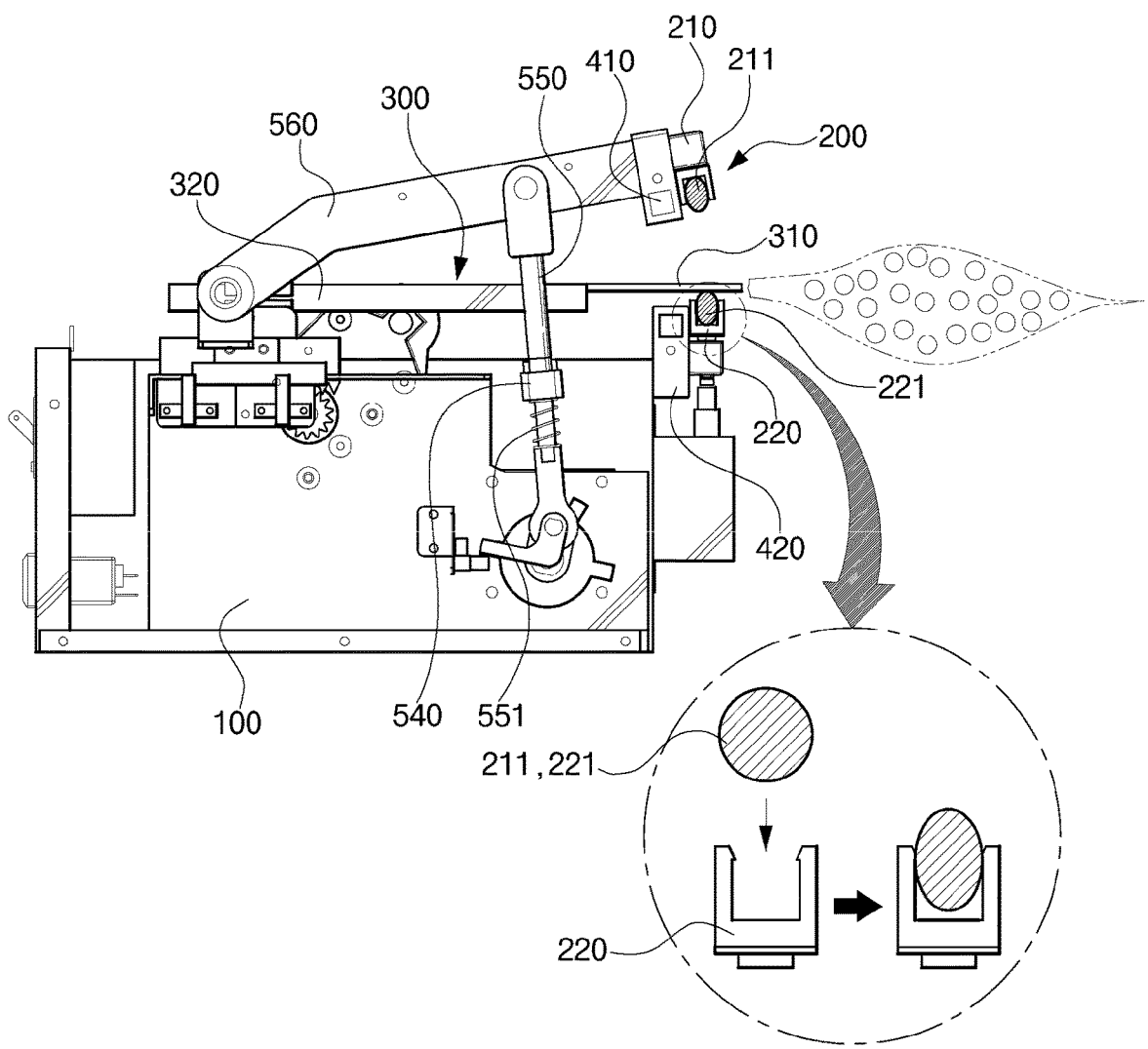
FIG. 2 is an exemplary view showing a side of the vacuum packaging device according to an embodiment of the present invention.
Figure 3:
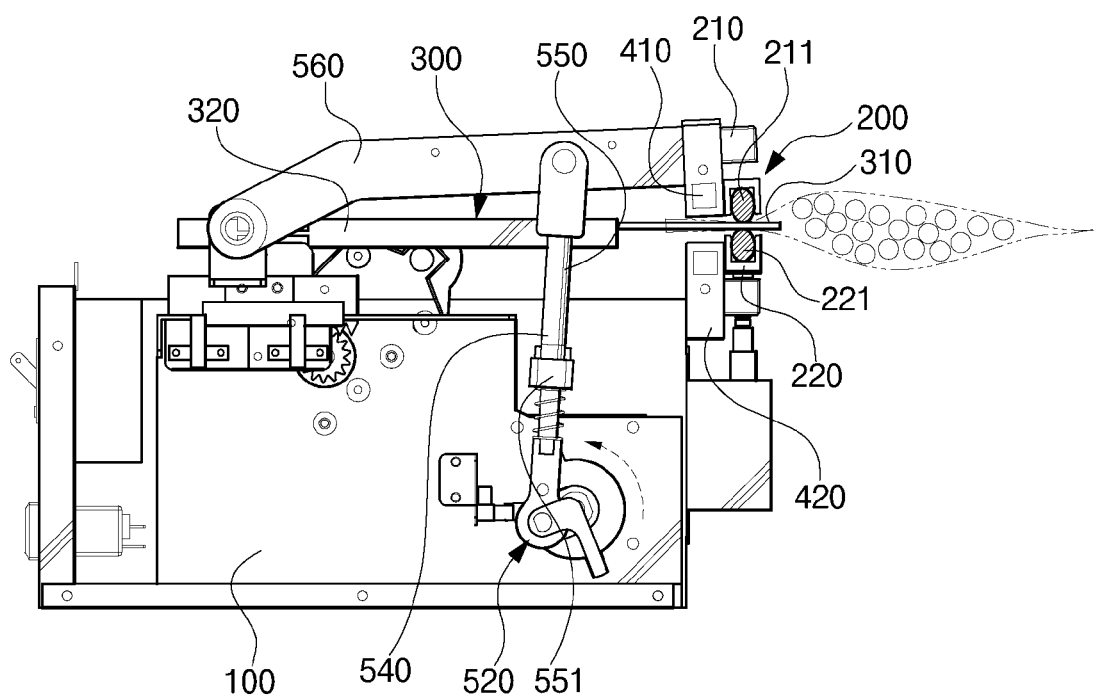
FIG. 3 is an exemplary view showing a state where the vacuum packaging device grips a packaging bag according to an embodiment of the present invention.

Referring to FIGS. 1 to 3, the vacuum packaging device according to an embodiment of the present invention includes a housing 100, a grip unit 200, a suction nozzle unit 300, heat-pressing members 410 and 420, and lifting and lowering means 500, and first, the housing 100 is formed as a rectangular box-shaped hexahedron, and an upper surface thereof forms an open shape.

In this case, a bottom surface of the housing 100 is provided with a plate comparatively thicker than a side surface, thereby preventing deformation of an overall appearance and preventing vibration, so that the durability of base materials mounted inside the housing 100 is improved.

In addition, the upper and rear surfaces of the housing 100 are provided in an open form, and a cover member and a lid can be detachably attached to the opening to facilitate maintenance of the device.

In addition, a grip unit 200 is provided on the upper front side of the housing 100 and the grip unit 200 includes a pair of grip bars 210 and 220 that are vertically parallel to each other selectively coming into surface contact with each other thereby gripping the end of the packaging bag that has entered between the pair of grip bars 210 and 220.

At this time, it is preferable that the grip unit 200 includes a lower grip bar 220 disposed on the upper front side of the housing 100 and an upper grip bar 210 located above the lower grip bar 220, and the upper grip bar 210 is selectively lowered to form a grip of the packaging bag by coming into surface contact with the lower grip bar 220.

Looking at the upper grip bar 210 and the lower grip bar 220 according to an embodiment of the present invention in more detail, the upper grip bar 210 and the lower grip bar 220 have a length corresponding to a width of the housing 100 in a lateral direction, are provided with elastic bars 211 and 221 each having elasticity on the sides coming into surface contact with each other in a longitudinal direction.

The upper grip bar 210 and the lower grip bar 220 each form fixing spaces 212 and 222 that are opened in a direction facing each other in the longitudinal direction inside each of the upper grip bar 210 and the lower grip bar 220 to provide the elastic bars 211 and 221. A side cross-section of the upper grip bar 210 forms a reverse U shape, and a side cross-section of the lower grip bar 220 forms a U shape.

The elastic bars 211 and 221 are respectively coupled to the inside of the fixing spaces 212 and 222 through the openings of the fixing spaces 212 and 222, so that the elastic bars 211 and 221 apply a uniform pressure in the lateral direction to the ends of the packaging bag that has entered between the upper grip bar 210 and the lower grip bar 220 to be gripped.

In this case, the elastic bars 211 and 221 have a circular side cross-section so that they can be coupled to the inside of the fixing spaces 212 and 222 of the grip bars 210 and 220, and are coupled by force fitting inside the fixing spaces 212 and 222 of the grip bars 210 and 220.

When the elastic bars 211 and 221 are coupled to the fixing spaces 212 and 222 of the grip bars 210 and 220, it is preferable that a length thereof is contracted in a front-rear direction, and is extended in a vertical direction to have an oval side cross-section, and a material is made of foamed silicone so as to have its own elasticity.

In addition, it is preferable that the elastic bars 211 and 221 are formed to have a cross-sectional area greater than that of the fixing spaces 212 and 222 of the grip bars 210 and 220, and a part thereof protrudes to the outside by $1/15$ to $1/5$ of the height of the cross-section of the fixing space in the fixing space.

Since the elastic bars 211 and 221 grip the end side of the packaging bag with their own elasticity, the grip force of the grip unit 200 is improved as well as separation of the packaging bag which is gripped between the upper grip bar 210 and the lower grip bar 220 is prevented, thereby preventing physical damage thereof.

Accordingly, when vacuum packaging of the packaging bag is performed by inserting the opening of the packaging bag between the pair of grip bars 210 and 220 according to an embodiment of the present invention, the pair of grip bars 210 and 220 grip the packaging bag with a uniform pressing force along the longitudinal direction of the grip bars 210 and 220, and thereby the packaging bag is not creased, and a defect rate can be significantly reduced.

In addition, heat-pressing members 410 and 420 are respectively coupled and provided to the pair of grip bars 210 and 220, and a pair of heat-pressing members 410 and 420 also come into surface contact with the packaging bag gripped between the upper grip bar 210 and the lower grip bar 220, and heat-press the ends of the suction-completed packaging bag to seal the packaging bag by heat sealing.

In addition, the inner space of the housing 100 is provided with the suction nozzle unit 300, the suction nozzle unit 300 includes a suction nozzle 310 that selectively moves forward and backward along a guide 320 fixed to the inner center of the housing 100 and penetrates into the opening of the packaging bag gripped by the grip unit 200 and suctions the atmosphere in the packaging bag to be a vacuum state.

At this time, the suction nozzle 310 is connected to a vacuum pump and a suction pipe in the inner space of the housing 100, and the guide 320 has an electric motor having a pinion gear and a rack corresponding to the pinion gear that moves forward and backward according to the rotation of the pinion gear.

Therefore, the suction nozzle 310 is fixed to the rack, and selectively moves forward or backward according to the rotational direction of the pinion gear depending on each process step.

In addition, the lifting and lowering means 500 lifts and lowers the upper grip bar 210 of the pair of grip bars 200 and the upper heat-pressing member 410 of the pair of heat-pressing members 410 and 420 in the inner space of the housing 100 by each process step.

Looking at the lifting and lowering means 500 according to an embodiment of the present invention in more detail, an electric motor 510 fixed on the bottom surface of the housing 100 made of a plate is provided, the electric motor 510 rotates a rotation shaft 511 by a control signal selectively applied from the outside.

At this time, a crank member 520 is connected to the rotation shaft 511 of the electric motor 510, and the crank member 520 includes a first crank arm 521 connected to the rotation shaft 511, a crank pin 522 of which the second A second crank having one end is connected to the first crank arm 521 and which constitutes a crank journal, and a second crank arm 523 that is coupled to the other end of the crank pin 522 to close the crank pin 522.

In the present invention, the connection between the rotation shaft 511 of the electric motor 510 and the crank member 520 is described as being directly connected, but the present invention is not limited thereto, and it is preferable that the rotation shaft 511 of the electric motor 510 and the crank member 520 are connected via a gear box.

In addition, a connecting rod 530 is connected to the crank pin 522 of the crank member 520, and the connecting rod 530 reciprocates up and down as the crank member 520 rotates like a normal connecting rod.

Accordingly, the connecting rod 530 converts the rotational motion of the crank member 520 interlocking according to the rotation of the rotation shaft 511 into a linear motion to lift and lower the upper grip bar 210 and the upper heat-pressing member 410, and a rotation angle of the rotation shaft 311 is controlled by the crank member 520 and the connecting rod 530, so that lifting and lowering of the upper grip bar 210 and the upper heat-pressing member 410 can be controlled by each process step.

Here, a horizontal bar 540 is connected to an upper end of the connecting rod 530, and when the connecting rod 530 lifts and lowers, the horizontal bar 540 lifts and lowers accordingly.

In addition, vertical links 550 are respectively vertically through-coupled to a left end and a right end of the horizontal bar 540, and a step for preventing the vertical link 550 from lowering is formed at the middle of the vertical link 550, and coil springs 551 are respectively provided at lower portions thereof, so that the vertical links 550 have elasticity.

The coil spring 551 of the vertical link 550 acts as a buffer when the grip bars 210 and 220 come into surface contact with each other, and the grip bars 210 and 220 have a constant gripping force with a repulsive force of the compressed coil spring 551.

In addition, the upper grip bar 210 and the upper heat-pressing member 410 are provided on the housing 100 by a pair of lifting and lowering arms 560, and front ends of the pair of lifting and lowering arms 560 are coupled to the upper grip bar 210 of the pair of grip bars 210 and 220, and the upper heat-pressing member 410 of the pair of heat-pressing members 410 and 420, and rear ends thereof are hinge-coupled to brackets provided on upper right and left sides of the housing 100.

In addition, the upper end of the vertical link 550 is connected to the middle of the pair of lifting and lowering arms 560, so that the pair of lifting and lowering arms 560 pivot about the hinge as the vertical link 550 lifts and lowers to lift and lower the upper grip bar 210 and the upper heat-pressing member 410.

Figure 4:
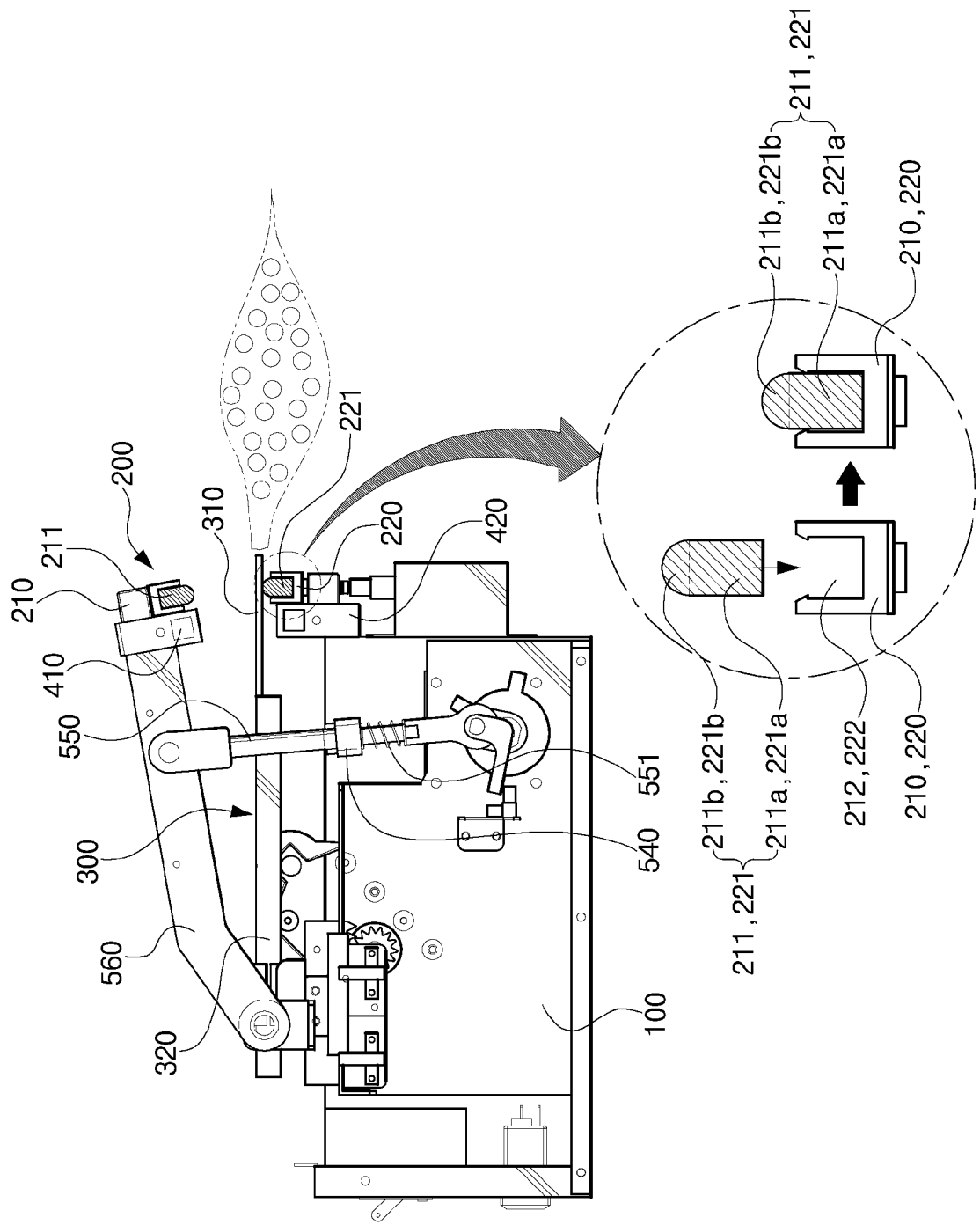
FIG. 4 is an exemplary view showing another embodiment state of an elastic bar in the vacuum packaging device according to an embodiment of the present invention.

Here, the elastic bars 211 and 221 of the vacuum packaging device according to an embodiment of the present invention are not limited to those having a circular side cross-section, and may be implemented as follows. Referring to FIG. 4, first, the elastic bars 211 and 221 have lengths corresponding to the fixing spaces 212 and 222 of the grip bars 210 and 220, and form the fixing bodies 211a and 221a that are coupled to and accommodated in the fixing spaces 212 and 222.

In this case, it is preferable that the fixing bodies 211a and 221a of the elastic bars 211 and 221 form a side cross-section in a shape corresponding to the shape of the fixing spaces 212 and 222.

In addition, grip heads 211b and 221b protruding to the outside of the fixing spaces 212 and 222 while forming a hemispherical cross-sectional shape in the vertical direction along the longitudinal direction are formed on the fixing bodies 211a and 221a.

At this time, the fixing bodies 211a and 221a and the grip heads 211b and 221b of the elastic bars 211 and 221 are preferably made of foamed silicone to have their own elasticity, and when the fixing bodies 211a and 221a of the elastic bars 211 and 221 are respectively coupled to the inside of the fixing spaces 212 and 222 through the openings of the fixing spaces 212 and 222, the grip heads 211b and 221b of the elastic bars 211 and 221 respectively apply a uniform pressure to the ends of the packaging bag that has entered between the upper grip bar 210 and the lower grip bar 220 in the horizontal direction to be gripped.

Since the grip heads 211b and 221b of the elastic bars 211 and 221 grip the end side of the packaging bag with their own elasticity, the grip force of the grip unit 200 is improved as well as separation of the packaging bag gripped between the upper grip bar 210 is prevented, and the lower grip bar 220, and physical damage thereof is prevented.

Figure 5:
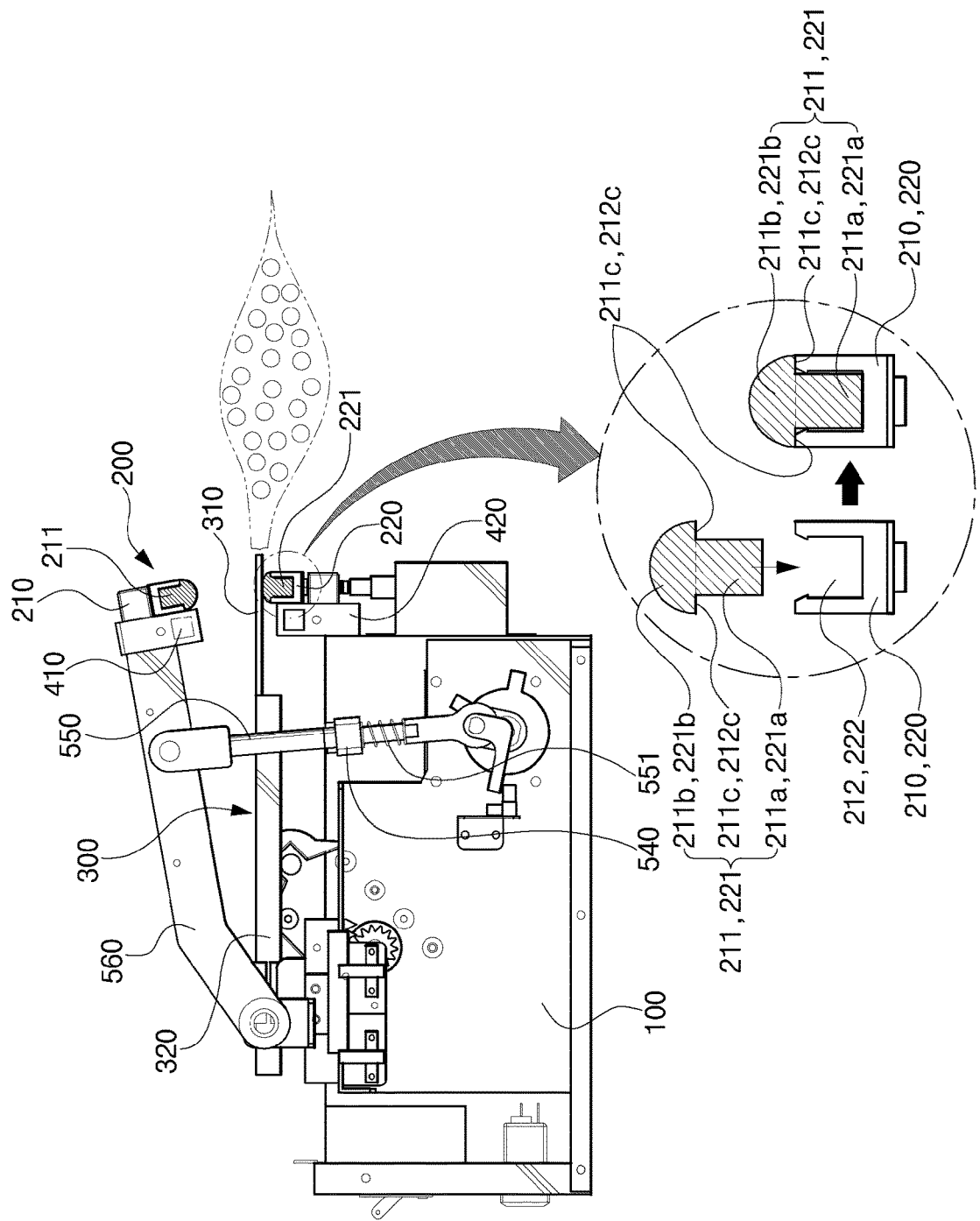
FIG. 5 is an exemplary view showing another embodiment state of the elastic bar in the vacuum packaging device according to an embodiment of the present invention.

In addition, referring to FIG. 5, the elastic bars 211 and 221 are not limited to the above configuration, and the elastic bars 211 and 221 are formed with fixing bodies 211a and 221a having lengths corresponding to the fixing spaces 212 and 222 of the grip bars 210 and 220, and being coupled to and accommodated in the fixing spaces 212 and 222, and grip heads 211b and 221b having semicircular cross-sectional shape in the vertical direction along the longitudinal direction, and protruding to the outside of the fixing spaces 212 and 222. A portion of the grip heads 211b and 221b forming a boundary with the fixing bodies 211a and 221a is formed to extend in the front-rear direction with a length corresponding to the width of the grip bars 210 and 220 to form steps 211c and 221c supported on the upper ends of the grip bars 210 and 220.

At this time, the fixing bodies 211a and 221a, the grip heads 211b and 221b, and the steps 211c and 221c of the elastic bars 211 and 221 are preferably made of foamed silicone so as to have their own elasticity. When the fixing bodies 211a and 221a of the elastic bars 211 and 221 are respectively coupled to the inside of the fixing spaces 212 and 222 through the openings of the fixing spaces 212 and 222, while the steps 211c and 221c of the elastic bars 211 and 221 are respectively supported on the upper and lower ends of the grip bars 210 and 220, the grip heads 211b and 221b apply a uniform pressure to to the ends of the packaging bag that has entered between the upper grip bar 210 and the lower grip bar 220 in the lateral direction to be gripped.

Since the grip heads 211b and 221b of the elastic bars 211 and 221 grip the end side of the packaging bag with their own elasticity, the grip force of the grip unit 200 is improved as well as separation of the packaging bag gripped between the upper grip bar 210 and the lower grip bar 220 is prevented, and physical damage thereof is prevented.

Although the present invention has been described with reference to the embodiments shown in the drawings, which are merely exemplary, those skilled in the art will understand that various modifications and equivalent other embodiments are possible therefrom. Therefore, the true technical protection scope of the present invention should be determined by the technical spirit of the appended claims.

The invention claimed is:

1. A vacuum packaging device comprising:
a hexahedral housing having a space inside;
a grip unit in which a pair of grip bars selectively come into surface contact with each other above a front side of the housing and which grip ends of a packaging bag that has entered between the pair of grip bars;
a suction nozzle unit which moves forward and backward along a guide inside an inner space of the housing, enters an opening of the packaging bag gripped by the grip unit, and sucks the atmosphere inside the packaging bag to be a vacuum state;
a pair of heat-pressing members which are respectively provided in the pair of grip bars, come into surface contact with each other to heat-press the ends of the packaging bag for which the suction has been completed to heat-fuse and seal the packaging bag;
lifting and lowering means for lifting and lowering an upper grip bar of the pair of grip bars and an upper heat-pressing member of the pair of the heat-pressing members inside the inner space of the housing by a process step;
fixing spaces, which are open in directions facing each other in a longitudinal direction, respectively formed inside the pair of grip bars; and
elastic bars, each elastic bar having
a fixing body which has a length corresponding to a corresponding fixing space of a corresponding grip bar and is accommodated by being coupled to the corresponding fixing space of the corresponding grip bar and
a grip head having a semicircular cross-sectional shape in a vertical direction along the longitudinal direction, the grip head protruding from an upper end of the corresponding grip bar,
wherein a portion of the grip head forming a boundary with each fixing body is formed to extend in a front-rear direction with a length corresponding to a width of each grip bar to form a step supported on an upper end of each grip bar,
wherein a width of the semicircular cross-section shape of the grip head is same as a width of each grip bar, the width extending from one end of a vertical outer surface to the other end of the vertical outer surface of each grip bar.

* * * * *